United States Patent [19]

Watanabe et al.

[11] Patent Number: 4,904,304
[45] Date of Patent: Feb. 27, 1990

[54] CHEMICAL GROUT FOR GROUND INJECTION AND METHOD FOR ACCRETION

[75] Inventors: Yoshitane Watanabe; Eiji Okumura; Mikio Ando, all of Funabashi, Japan

[73] Assignee: Nissan Chemical Industries Ltd., Tokyo, Japan

[21] Appl. No.: 137,940

[22] Filed: Dec. 28, 1987

[30] Foreign Application Priority Data

Dec. 29, 1986 [JP] Japan ................................. 61-315855

[51] Int. Cl.⁴ ........................ C04B 14/04; C09K 17/00
[52] U.S. Cl. ..................................... 106/85; 106/900; 405/266
[58] Field of Search ................... 106/900, 85; 405/266

[56] References Cited

FOREIGN PATENT DOCUMENTS

| 56-155287 | 12/1981 | Japan | 106/900 |
|---|---|---|---|
| 59-66482 | 4/1984 | Japan | . |
| 59-093787 | 5/1984 | Japan | 106/900 |
| 59-93788 | 5/1984 | Japan | . |
| 59-179579 | 10/1984 | Japan | . |

OTHER PUBLICATIONS

James G. Vail, *Soluble Silicates*, vol. 1, 1952, pp. 158–159.
Ralph K. Iler, *The Chemistry of Silica*, 1979, pp. 378–387 and 560–563.
Ralph K. Iler, *Colloid Chemistry of Silica and Silicates*, 1955, pp. 181–184.
Patent Abstracts of Japan, vol. 6, No. 40 (C–94) [918], Mar. 12, 1982, JP-A-56 155 287.
Patent Abstracts of Japan, vol. 7, No. 108 (C–165) [1253], May 11, 1983, JP-A-58 29 882.
Patent Abstracts of Japan, vol. 7, No. 147 (C–173) [1292], Jun. 28, 1983, JP-A-58 59 281.
Patent Abstracts of Japan, vol. 10, No. 235 (C–366) [2291], Aug. 14, 1986, JP-A-61 69 887.

*Primary Examiner*—Mark L. Bell
*Assistant Examiner*—Anthony J. Green
*Attorney, Agent, or Firm*—Oliff & Berridge

[57] ABSTRACT

A chemical grout for ground injection which is prepared by incorporating from 0.1 to 4.5 parts by weight of sulfamic acid and from 0.2 to 10.0 parts by weight of a water soluble magnesium salt into 100 parts by weight of an aqueous sol having a pH of 8 to 10.5 and containing from 5 to 25% by weight of colloidal silica (as $SiO_2$) having a particle size of 3 to 7 m$\mu$, and from 0.05 to 1.5% by weight of $Na_2O$. This injecting grout has a gelation time not longer than 300 minutes. Soft ground can be consolidated by using the grout.

15 Claims, 1 Drawing Sheet

CHEMICAL GROUT FOR GROUND INJECTION AND METHOD FOR ACCRETION

BACKGROUND OF THE INVENTION

The present invention relates to an improvement in a silica sol-chemical grout for ground injection and to a method for accretion (i.e., strengthening the ground) by using the same.

In cases where, in constructing dams, tunnels, etc., the ground around the construction site is soft or underground water gushes forth, it has been customarily practiced to fill a grout into the soil in order to consolidate the soil or to stop the gushing of water. A chemical grout to be used for the grouting is referred to as "grouting material," and various grouting materials have already been proposed. Of known grouting materials, those in which a silica sol is used as a major component have been attracting attention since they do not cause pollution of the surrounding soil.

Grouting materials which have been most widely used are so-called water-glass grouting materials in which water glass is used as a major component together with a hardener, such as acids, salts, etc. The water-glass grouting materials can be advantageous in that they solidify within a short period of time and are capable of giving high solidification strength. However, because of their short solidification period, the gelation of such grouting materials may occur before they reach to the desired depth and, hence, the soil may not be sufficiently strengthened. In addition to this, not only sodium salts, but also acids, etc., which are used as hardeners, tend to dissolve out of the consolidated ground to pollute the surrounding soil, and the consolidated ground tends to become weak with the lapse of time.

As an improvement for such water-glass grouting materials, there have been proposed those grouting materials in which a silica sol having an extremely low sodium content is used as a major component. For example, in Japanese Patent Laid Open No. 66,482/84 is disclosed a grouting material comprising a silica sol containing a colloidal silica which has a particle size of from 6 to 50 μm and contains about 0.2 to 4% by weight of $Na_2O$, as a major component, and a substance that releases metal ions of such metals as alkaline earth metals (e.g., calcium) and aluminum as a hardener.

In Japanese Patent Laid-Open No. 93,788/84 is disclosed a grouting material in which an alkaline silica sol is used as a major component, and a combination of (i) an acid, such as sulfuric acid, hydrochloric acid, nitric acid, phosphoric acid, carbonic acid, etc. and (ii) a salt, such as sodium sulfate, sodium chloride, aluminum sulfate, etc., used as a hardener.

There is also disclosed in Japanese Patent Laid-Open No. 179,579/84 a grouting material in which a silica sol containing 3 to 25% by weight of colloidal silica (as $SiO_2$) and 0.6 to 5% by weight of $Na_2O$ is used as a major component, and a combination of (i) an organic solvent, such as butyrolactone, ethylene glycol diacetate, glyoxal, etc, (ii) an auxiliary agent, such as phosphoric acid, sodium sulfate, sodium carbonate, magnesium sulfate, magnesium carbonate, etc. and (iii) an adjuster, such as sodium hydrogencarbonate, etc. is used as a hardener.

However, the grouting material described in Japanese Patent Laid-Open No. 66,482/84 could hardly be infiltrated sufficiently into the ground because the calcium ions used as a hardener cause the gelation of the material within a very short period of time. In the case of the grouting material disclosed in Japanese Patent Laid Open No. 93,788/84, its gelation time fluctuates widely with even slight changes in the amount of aluminum sulfate added for the shortening of the gelation time. In addition, it is capable of forming a uniform gel only in the acidic region. It is therefore difficult to prepare a grouting material that exhibits a stable property. The grouting material described in Japanese Patent Laid-Open No. 179,579/84 suffers from the disadvantage that the organic solvents and the salts contained in relatively large quantities tend to dissolve out to cause pollution of the surrounding soil.

SUMMARY OF THE INVENTION

It is an object of the present invention to provide an improved chemical grout for silica-gel ground injection which gives easily controllable gelation time, is capable of forming a stable consolidated ground having high strength, and does not cause pollution of the surrounding soil by such chemicals as salts, acids, alkalis or organic substances.

It is another object of the present invention to provide a method for accretion by using the above chemical grout for ground injection.

There is provided by the present invention a chemical grout for ground injection which comprises from 0.1 to 4.5 parts by weight of sulfamic acid and from 0.2 to 10.0 parts by weight of a water soluble magnesium salt, per 100 parts by weight of an aqueous sol having a pH of 8 to 10.5, and containing from 5 to 25% by weight of colloidal silica (as $SiO_2$) having a particle size of 3 to 7 mμ, and from 0.05 to 1.5% by weight of $Na_2O$.

DETAILED DESCRIPTION OF PREFERRED EMBODIMENTS OF THE INVENTION

Figure 1:
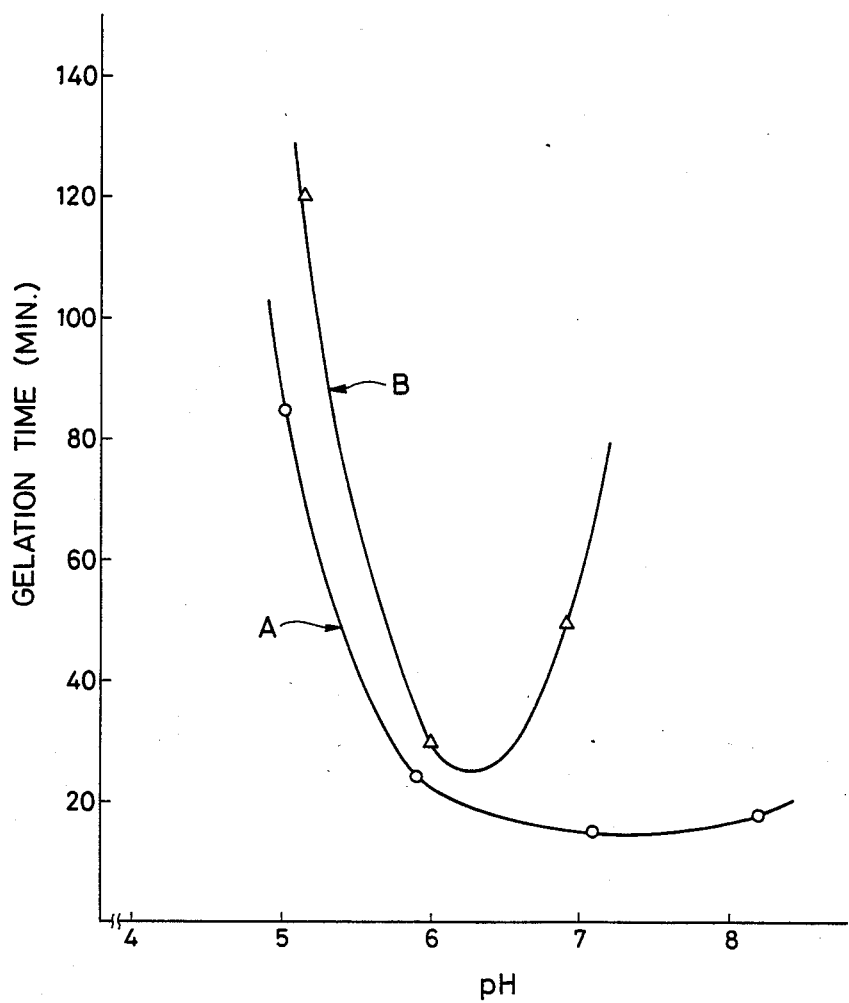
FIG. 1 is a graph obtained by plotting the pH of the chemical grout for ground injection shown in Table 2 against their gelation time on a rectangular coordinate, the ordinate of which indicates pH values and the abscissa indicates gelation time.

The aqueous silica sol to be used in the invention is a sol containing dispersed colloidal silica having an extremely small particle size (3 to 7 mμ). Such an aqueous sol can be as stable as ordinary aqueous silica sols and can remain unchanged almost permanently. Such a silica sol can be prepared in accordance with the methods described, for example, in U.S. Pat. Nos. 3,711,419 and 3,714,064 and Japanese Patent Application No. 147,365/85. Preferably, the concentration of $SiO_2$ in the sol is from 5 to 25% by weight and the content of $Na_2O$ is from 0.05 to 1.5% by weight, and its pH is from 8 to 10.5. It can be particularly preferable to use an aqueous silica sol having a particle size of colloidal silica of from 4 to 6 mμ and a content of $SiO_2$ of from 10 to 25% by weight.

Sulfamic acid and water soluble magnesium salts (preferably, magnesium sulfamate, magnesium sulfate, etc.) to be used in the invention can be of commercial grade available on the market. However, better results can be obtained by the use of sulfamic acid and water soluble salts of higher purity. It is preferable to use the chemicals in the form of an aqueous solution.

The chemical grout for ground injection (hereinafter referred to as "ground injection grout") of the invention can be readily obtained by admixing 100 parts by weight of said aqueous silica sol with 0.1 to 4.5 parts by weight of sulfamic acid and 0.2 to 10.0 parts by weight of magnesium salt of sulfamic acid or sulfuric acid. The ground injection grout of the invention can be previously prepared just before the injection or can be formed in the ground by the admixture of said ingredients. The ground injection grout of the invention can be additionally provided with other ingredients as long as the objects of the invention can be attained. For instance, the chemical grout of the present invention may contain a silica sol having particle sizes outside the range of the present invention as long as the nature of the chemical grout of the present invention is not damaged. In one preferred embodiment, the injection grout of the present invention comprises colloidal silica (as $SiO_2$) at a concentration of from 8 to 24% by weight, in combination with 0.3 to 3.0 parts by weight of sulfamic acid and 0.5 to 7.0 parts by weight of magnesium salt of sulfamic acid or sulfuric acid, per 100 parts by weight of an aqueous sol of said colloidal silica.

The gelation time of the ground injection grout of the invention can be arbitrarily changed within a range up to 300 minutes, in particular, within a range of from 1 to 100 minutes, by adjusting its pH to 5 to 9.0. The adjustment of the pH can be effected by adjusting the concentration of the silica of the aqueous silica sol and the concentration of sulfamic acid or magnesium salt of sulfuric acid, or by adjusting the ratio of the silica sol to the magnesium salt of sulfamic acid or magnesium salt of sulfuric acid, in particular, by adjusting the ratio, in moles, of the amount of the sulfamic acid or the total amount of sulfamic acid and sulfuric acid to the amount of magnesium to 0.01:1.0 to 1.0:1.0.

When an aqueous sol containing colloidal silica having a particle size not smaller than 7 m$\mu$ is used as a grouting material, it is not possible to attain a sufficiently high solidification strength. The solidification strength becomes markedly higher when the particle size of the colloidal silica is smaller than 7 m$\mu$. However, if the particle size of the colloidal silica is not greater than 3 m$\mu$, the aqueous sol becomes poorly stable and, therefore, even if it is used as a grouting material, it becomes difficult to adjust its gelation time to a constant level or to attain a constant solidification strength. Aqueous sols having a particularly preferable particle size of from 4 to 6 m$\mu$ provide both excellent stability and sufficiently high solidification strength. In general, the higher the concentration of the colloidal silica in the sol, the lower the stability of the sol. Accordingly, in order to effect the solidification of ground in a constant gelation time to a constant solidification strength by using a sol of a colloidal silica having a particle size of 3 to 7 m$\mu$ in a grouting material, the concentration of colloidal silica in said sol must be less than 25% by weight. However, if the concentration is less than 5% by weight, it is not possible to attain high solidification strength. In general, silica sols having a particle size as small as 3 to 7 m$\mu$ has a low alkali content (reduced to $Na_2O$), usually of from 0.05 to 1.5% by weight. However, the sol is unstable at a pH lower than 8 or higher than 10.5. Therefore, in order to use the sol as a grouting material, its pH is preferably in the range of from 8 to 10.5. The low alkali content of the sol helps to minimize the amount of alkali released into the surrounding soil even after the solidification of the injected grouting material.

As described hereinabove, the gelation time can be adjusted by controlling the concentration of silica in the silica sol, the amount of hardeners (i.e., sulfamic acid and magnesium salts), and the pH of the grout. To be more specific, in cases where the amount of the hardeners added and the pH are constant, the gelation time becomes shorter with an increase in the concentration of silica. In cases where the concentration of silica is constant, the gelation time becomes shorter with an increase in the amount of hardeners added, provided that the pH is not lower than 5. In cases where the amount of hardeners added is constant, the gelation time becomes shorter with an increase in the amount of magnesium ions. The gel strength becomes greater with an increase in the concentration of silica. If the concentration of silica is too low, it is not possible to attain high gel strength even in cases where the gelation time is quite short.

When the pH of the above-described silica sol is adjusted to 5 to 7 by the addition of an acid, gelation of the sol occurs. In such a case, however, the time required for its gelation (i.e., gelation time) is so long that it is not possible to obtain a good grouting material simply by means of the addition of an acid so as to adjust pH to the above range. The gelation of the silica sol also takes place when an alkali earth metal, for example, calcium hydroxide, is added thereto instead of the acid described above. In this case, however, the sol formed is not uniform and therefore not suited for use as a grouting material. In spite of this, it has been found that a uniform gelation of the silica sol takes place within a short period of time when its pH is adjusted to 5 to 9.0 by the addition of both magnesium sulfate and sulfamic acid.

The degree of dissociation of magnesium sulfamate in an aqueous solution is 0.86 at a concentration of 1,000 ppm, and 0.79 at 1%. In other words, it becomes smaller with an increase in its concentration. It can therefore be presumed the $Mg^{++}$ ions and sulfamate ions are present in such a state that they are bonded to a considerable degree at concentrations employed in the present invention. This contributes, it has been found, to the said favorable gelation of the silica sol. Therefore, in the ground injection grout of the invention, sulfamic acid added to the silica sol functions not only as a pH adjuster to cause the gelation of the silica sol, but also as a substance for furnishing sulfamate ions that cause the favorable gelation described hereinabove. Water soluble magnesium salts also function as a source for supplying magnesium ions that induce the favorable gelation. In addition, the magnesium ions also contribute to the formation of magnesium silicate that interacts with colloidal silica to give a high consolidation strength.

Substances that cause the gelation of silica sol used as a major component in silica sol grouting materials are referred to as "gelling agents" or "hardeners." If a slight change in the concentration of such a substance causes a considerable fluctuation in the gelation time, it is not preferable to use such a gelling agent or hardener. Gelling agents and hardeners lack practicability if their ions diffuse from the consolidated soil into the surrounding soil in large quantities or if they are substantially poisonous even when diffused in small quantities. The gelling agents used in the invention, namely, sulfamic acid, magnesium sulfamate, magnesium sulfate, etc., are free from the problems. It is known that sulfate ions attack concrete and cause the swelling of the material. However, even in cases where a concrete structure is present near the soil to be injected with the grout, the above problem can be avoided by using sulfamic acid together with magnesium sulfamate as a gelling agent.

In the ground injection grout of the present invention, sulfamic acid and a magnesium salt are added to the silica sol in quantities necessary to adjust its gelation time to 1 to 100 minutes and to adjust its pH value to 5 to 9.0, where the desired gelation takes place. As stated hereinbefore, it has been found that it is preferable to use from 0.1 to 4.5 parts by weight of sulfamic acid and from 0.2 to 10.0 parts by weight of magnesium salts, per 100 parts by weight of said silica sol. It is preferable to use sulfamic acid, magnesium salts, etc. in the form of an aqueous solution, which can be prepared prior to their addition. The concentration of sulfamic acid and magnesium salts in the aqueous solutions can be up to their maximum saturation solubility, and the solutions can be diluted to a desired concentration at the time of their use. The formation of heterogenous gel and the fluctuation in the gelation time can be prevented by using such aqueous solutions.

EXAMPLES AND COMPARATIVE EXAMPLES

In the following examples, the following commercially available Silica Sols (a), (b) and (c) were used:

| Silica Sol | Particle Size (mµ) | $SiO_2$ (Wt %) | $Na_2O$ (Wt %) | pH |
|---|---|---|---|---|
| (a) | 5.0 | 20.3 | 0.3 | 9.1 |
| (b) | 9.0 | 30.2 | 0.4 | 10.0 |
| (c) | 12.5 | 30.2 | 0.3 | 9.9 |

A commercially available high purity sulfamic acid was used. Commercially available magnesium sulfate and sulfuric acid of reagent grade were used. The magnesium sulfamate was prepared in a laboratory as an aqueous 48.7% by weight solution (Mg, 5.2 wt%; $NH_2SO_3$, 43.5wt%; molar ratio of $NH_2SO_3H/Mg$, 2.1:1.0; and pH, 7.69).

In the grouting test into sands, there were prepared steel containers having an inner diameter of 50 mm and a height of 100 mm charged with sands produced in Chiba Prefecture, Japan.

The pH and gelation time of the ground injection grouts described in Table 1, below, were determined, and the compressive strength of the gels obtained was also determined. In the examples where the grouts were injected into the sands, there were determined the uniaxial compression strength of the consolidated sands and the permeation rate of water in the consolidated sands.

Example 1

Into a beaker were charged 0.52 g of sulfamic acid, 1.31 g of magnesium sulfamate and 4.71 g of water, and these chemicals were completely dissolved to obtain an aqueous solution of the gelling agents. Into another beaker were charged 70 g of Silica Sol (a). Then the aqueous solution of the gelling agents prepared above was added thereto, and the resulting mixture was stirred to form a homogeneous fluid. Its pH was 7.1. The resulting fluid was immediately injected into the sands (at 25° C.) contained in one of the steel containers to fill the voids of the sands. When the remaining fluid was allowed to stand at 25° C., it gelled in 15 minutes. After being allowed to stand for 1 day, the gel had a gel compression strength of 0.50 Kg/cm$^2$. After the solidified sand mass had been allowed to stand for 1 day, test samples were prepared therefrom, and their strength and water permeability rate were determined. There were obtained a uniaxial compression strength of 4.5 Kg/cm$^2$ and a permeability rate of $3.4 \times 10^{-7}$ cm/sec. The above-described gel which gelified in 15 minutes was allowed to stand for 28 days and its compression strength was measured. It was 0.47 Kg/cm$^2$.

Example 2

A ground injection grout was prepared in a similar manner as in Example 1, using 70 g of Silica Sol (a), 0.4 g of sulfamic acid, 1.31 g of magnesium sulfamate, 0.72 g of magnesium sulfate and 6.83 g of water. The grout obtained had a pH of 7.3. Its gelation time was 8 minutes, and the gel obtained had a compression strength of 0.62 Kg/cm$^2$ after being allowed to stand for 1 day, and 0.59 Kg/cm$^2$ after being allowed to stand for 28 days. The solidified sands prepared had a monoaxial compression strength of 5.6 Kg/cm$^2$ and a permeability of $2.1 \times 10^{-7}$ cm/sec.

Comparative Example 1

A ground injection grout was prepared in a similar manner as in Example 1, using 70 g of Silica Sol (c) (silica sol of large particle size), 0.47 g of sulfamic acid, 1.16 g of magnesium sulfamate and 4.19 g of water. The grout obtained had a pH of 6.9. The gelation time of the fluid was 240 minutes. It was not possible to determine its gel strength since it could not be taken out of the mold even after 24 hours.

The above results show that the ground injection grouts according to the invention give high solidification strength because silica sols composed mainly of colloidal silica having a small particle size were used therein.

Example 3 and Comparative Example 2

Ground Injection Grouts 1 to 5 (samples according to the invention) and Ground Injection Grouts 6 and 7 (control samples) were prepared in a similar manner as in Example 1, using ingredients shown in Table 1, and their pH, gelation time and the compression strength of gels prepared therefrom were determined. Results obtained are shown in Table 1.

The gel strength of Sample 4 in Example 3 was slightly low. This is because the silica sol was diluted with the same amount (i.e., twice) of water. Taking this into consideration, it can be said that all the results of Example 3 are good. On the other hand, Sample 6 in Comparative Example 2, in which no magnesium gelling agent was used, had only a low gel strength, and Sample 7 in the same comparative example, in which sulfamic acid (gelling agent) was not used, no uniform gel was formed and, hence, it was not possible to determine its compression strength.

The above results show that when sulfamic acid is used as a gelling agent together with a magnesium salt, there can be obtained gels having an improved strength.

The gels according to the invention showed further enhanced strengths after several months. Accordingly, the method of the invention can also be advantageous as a method for producing a highly durable gel.

TABLE 1

| | Sample | Silica Sol (g) | | Gelling Agent (g) | | Water Added (g) | pH | Gelation Time (min.) | After 1 Day | After 28 Days |
|---|---|---|---|---|---|---|---|---|---|---|
| Example 3 | 1 | (a) | 70 | SMA* | 0.31 | 2.74 | 8.2 | 18 | 0.45 | 0.43 |
| | | | | SMA-Mg** | 0.76 | | | | | |
| | 2 | (a) | 70 | SMA | 0.75 | 6.79 | 5.9 | 24 | 0.42 | 0.41 |
| | | | | SMA-Mg | 1.89 | | | | | |
| | 3 | (a) | 70 | SMA | 0.55 | 7.42 | 6.5 | 17 | 0.46 | 0.43 |
| | | | | Magnesium Sulfate | 0.70 | | | | | |
| | 4 | (a) | 35 | SMA | 0.36 | 3.60 | 6.2 | 28 | 0.28 | 0.26 |
| | | Diluted Water | 35 | SMA-Mg | 2.92 | | | | | |
| | 5 | (a) | 40 | SMA | 0.72 | 6.48 | 6.9 | 20 | 0.38 | 0.37 |
| | | (b) | 25 | SMA-Mg | 1.60 | | | | | |
| Comparative Example 2 | 6 | (a) | 70 | SMA | 0.59 | 5.27 | 7.0 | 70 | 0.18 | 0.17 |
| | 7 | (a) | 70 | 20% Sulfuric Acid | 1.34 | 2.5 | 6.8 | 20 | Not uniformly gelled | |
| | | | | Magnesium Sulfate | 0.05 | | | | | |

*SMA: Sulfamic acid.
**SMA-Mg: Aqueous solution of 48.7% by weight of magnesium sulfamate.

Example 4 and Comparative Example 3

Sulfamic acid and magnesium sulfamate were dissolved in water to prepare a gelling agent containing 16.7% by weight of sulfamic acid and 1.0% by weight of magnesium. This gelling agent was used in Example 4. In Comparative Example 3, an aqueous 20% by weight solution of sulfuric acid was used as a gelling agent.

Seven beakers in which 70 g each of Silica Gel (a) was charged were prepared, and then the gelling agents were separately added thereto in amounts shown in Table 2. The pH and the gelation time of the thus prepared injection grouts were determined. Results obtained are shown in Table 2. It would be understood from the table that the gelation time of the samples examined in the comparative example fluctuates widely with a slight change in the amount of the gelling agent added, whereas the samples of Example 4 show relatively small fluctuations in gelation time even when the amount of the gelling agent varied widely.

In addition, the results shown in Table 2 indicate that gelation time of the samples according to the invention fluctuates only slightly (about 15 to 25 min.) when their pH values varied over a wide range (about 6 to 8), whereas gelation time of the samples in Comparative Example 3 fluctuates over a wide range (30 to 120 min.) when its pH changed from about 5 to 7. This would be understood more clearly from FIG. 1, in which the relationship between the pH and the gelation time of the samples are shown on a rectangular coordinate.

TABLE 2

| | Amount of Gelling Agent Added (g) | pH | Gelation Time (Min.) |
|---|---|---|---|
| Example 4 | 10.17 | 5 | 85 |
| | 9.43 | 5.9 | 24 |
| | 6.54 | 7.1 | 15 |
| | 3.81 | 8.2 | 18 |
| Comparative Example 3 | 1.89 | 5.1 | 120 |
| | 1.52 | 6.0 | 30 |
| | 1.34 | 6.9 | 50 |

The present invention makes it possible to readily obtain a silica gel grouting material having a gelation time of from 1 to 100 minutes. Since the gelation time of the grouting material does not fluctuate widely over a range of pH of from 6 to 9.0, it is possible to attain a constant result in the accretion. Moreover, the grouting material is capable of imparting a high solidification strength to the ground into which it is injected. After solidification, only a very small amount of salts dissolves out of the solidified ground. Because of this, it does not pollute the surrounding soil and, even in the case where there is a concrete structure near the injected site, it causes no cracks in the concrete. In addition, the grouting material of the invention does not show fluctuations in the gelation time not only in the neutral pH region, but also in both alkaline and acidic regions. Therefore, the grouting material according to the invention can be easily prepared on site, without requiring strict control in the amount of ingredients to be admixed.

What is claimed is:

1. A chemical grout for ground injection, comprising:
    an aqueous sol having an original pH of 8 to 10.5, said aqueous sol comprising (a) 5 to 25% by weight of colloidal $SiO_2$ having a particle size of 3 to 7 m$\mu$, (b) 0.05 to 1.5% by weight of $Na_2O$ and (c) water;
    0.1 to 4.5 parts by weight of sulfamic acid per 100 parts by weight of said aqueous sol; and
    0.2 to 10.0 parts by weight of a water soluble magnesium salt selected from the group consisting of magnesium sulfamate, magnesium sulfate and a mixture thereof per 100 parts by weight of said aqueous sol.

2. A chemical grout as defined in claim 1, wherein a gelation time of said grout is not more than about 300 minutes.

3. A chemical grout as defined in claim 2, wherein said gelation time is from about 1 to about 100 minutes.

4. A chemical grout as defined in claim 1, wherein said aqueous sol has a content of colloidal $SiO_2$ of from 8 to 24% by weight.

5. A chemical grout as defined in claim 1, wherein said colloidal $SiO_2$ has a particle size of from 4 to 6m$\mu$.

6. A chemical grout as defined in claim 1, wherein said sulfamic acid is contained in an amount of from 0.3 to 3.0 parts by weight.

7. A chemical grout as defined in claim 1, wherein said magnesium salt is magnesium sulfamate and is contained in an amount of from 0.5 to 0.7 parts by weight.

8. A chemical grout as defined in claim 1, wherein a ratio in moles of the amount of magnesium in said magnesium salt to the amount of sulfamic acid or to the total amount of sulfamic acid and sulfuric acid is in the range of from 0.01 to 1.0.

9. A chemical grout as defined in claim 8, wherein said ratio is in the range of from 0.1 to 1.0.

10. A chemical grout as defined in claim 1, wherein said sulfamic acid and said magnesium salt are added to said aqueous sol in the form of an aqueous solution with a concentration lower than that at saturation solubility.

11. A chemical grout as defined in claim 1, wherein said grout has a pH of 5 to 9.0.

12. A method for strengthening soft ground, comprising injecting into said ground a chemical grout comprising:

an aqueous sol having an original pH of 8 to 10.5, said aqueous sol comprising (a) 5 to 25% by weight of colloidal $SiO_2$ having a particle size of 3 to 7 m$\mu$, (b) 0.05 to 1.5% by weight of $Na_2O$ and (c) water;
0.1 to 4.5 parts by weight of sulfamic acid per 100 parts by weight of said aqueous sol; and
0.2 to 10.0 parts by weight of a water soluble magnesium salt selected from the group consisting of magnesium sulfamate, magnesium sulfate and a mixture thereof per 100 parts by weight of said aqueous sol.

13. A method of making a chemical grout for ground injection, comprising adding (a) 0.1 to 4.5 parts by weight of sulfamic acid and 0.2 to 10.0 parts by weight of a water soluble magnesium salt selected from the group consisting of magnesium sulfamate, magnesium sulfate and a mixture thereof to (b) 100 parts by weight of an aqueous sol having a pH of 8 to 10.5 and comprising 5 to 25% by weight of colloidal $SiO_2$ having a particle size of 3 to 7 m$\mu$ and 0.05 to 1.5% by weight of $Na_2O$ and water.

14. A method as defined in claim 13, wherein a pH of said chemical grout is adjusted to 5 to 9.0 by said addition of sulfamic acid and magnesium salt.

15. A method as defined in claim 13, wherein said sulfamic acid and said magnesium salt are added to said aqueous sol in the form of an aqueous solution with a concentration lower than that at saturation solubility.

* * * * *